United States Patent [19]

Koga

[11] Patent Number: 4,733,298

[45] Date of Patent: Mar. 22, 1988

[54] METHOD OF CODING A VIDEO SIGNAL WHEREBY PICTURES CAN BE REPRODUCED WITH A HIGH QUALITY AND A DEVICE THEREFOR

[75] Inventor: Toshio Koga, Tokyo, Japan

[73] Assignee: NEC Corporation, Japan

[21] Appl. No.: 797,630

[22] Filed: Nov. 13, 1985

[30] Foreign Application Priority Data

Nov. 14, 1984 [JP] Japan .................................. 59-240057

[51] Int. Cl.[4] .......................... H04N 7/12; H04N 7/18
[52] U.S. Cl. ..................................... 358/133; 358/105; 358/136; 358/138
[58] Field of Search ................ 358/105, 135, 136, 138, 358/133

[56] References Cited

U.S. PATENT DOCUMENTS

| | | | |
|---|---|---|---|
| 4,218,704 | 8/1980 | Netravali et al. | 358/136 |
| 4,307,420 | 12/1981 | Ninomiya et al. | 358/105 X |
| 4,437,119 | 3/1984 | Matsumoto et al. | 358/136 |
| 4,562,468 | 12/1985 | Koga | 358/135 X |
| 4,620,225 | 10/1986 | Wendland et al. | 358/105 X |

Primary Examiner—E. A. Goldberg
Assistant Examiner—Patrick W. Foster
Attorney, Agent, or Firm—Laff, Whitesel, Conte & Saret

[57] ABSTRACT

In coding a digital video signal representative of successive pictures by using correlation between the successive pictures, each picture is divided into a predetermined number of blocks of picture elements. An original motion vector is used to represent a movement of each block between two pictures. The digital video signal is predictively coded by using the original motion vector to produce a coded signal. An on-off control signal is produced in order to determine whether or not subsampling is carried out at each of the blocks. A part of the coded signal is subsampled into a subsampled signal with reference to the on-off control signal and a remaining part is left as it is as a non-subsampled signal. The subsampled and the non-subsampled signals are code-converted into a converted code signal. The original motion vector and the on-off control signal are code-converted into a converted motion vector signal and a converted control signal which is distinguishable from the converted motion vector signal. The converted control signal specifies transition points which appear in the on-off control signal when the on-off control signal is switched between off and on.

7 Claims, 5 Drawing Figures

METHOD OF CODING A VIDEO SIGNAL WHEREBY PICTURES CAN BE REPRODUCED WITH A HIGH QUALITY AND A DEVICE THEREFOR

BACKGROUND OF THE INVENTION

This invention relates to a method of coding a digital video signal representative of successive pictures by the use of correlation between the successive pictures. This invention relates also to a coding device for use in carrying out the method and to a decoding device for decoding an output signal of the coding device.

Each of the successive pictures is called a frame when the digital video signal is, for example, a television signal. On transmitting the television signal, an interframe predictive coding method is effective to achieve data compression of transmission data and to thereby reduce the amount of the transmission data as is known in the art. The interframe predictive coding method makes use of correlation between successive frames. That is to say, a difference of a picture element between two of the pictures is coded as a coded signal for transmission.

It is possible by the interframe predictive coding method to transmit a completely still picture and an approximately still picture with a high compressibility of the transmission data and to receive the transmission data to reproduce the picture with a high quality. This is because there is almost no difference between the picture elements of the completely and the approximately still pictures. The interframe predictive coding method is, however, defective in that the quality of the reproduced picture becomes low when the high compressibility is retained even for a large movement. This is because the difference becomes large as a result of a decrease in the correlation between successive pictures.

In order to remove the defect, an improved method is proposed. The improved method is called a motion-compensation method. In the improved method, each of the pictures is divided into a predetermined number of blocks of picture elements. A motion vector is detected which represents a movement of each block between two of the pictures. Prediction is carried out with a high accuracy by using the motion vector. With this structure, the difference of the picture element between two of the pictures becomes small on transmission of the picture which includes a large movement. It is therefore possible to transmit the picture including a large movement with a high compressibility of the transmission data and to receive the transmission data to reproduce the picture with a high quality. The improved method is disclosed, for example, in U.S. Pat. No. 4,307,420 issued to Yuichi Ninomiya et al and assigned to Nippon Hôste,cir/o/ Kuôkai, a public television broadcasting association in Japan.

However, the improved method is still defective in that the amount of the transmission data becomes large when the movement has a high speed. This is because the difference becomes large between the picture elements of the pictures when the movement has a high speed.

In order to reduce the amount of the transmission data, subsampling of the coded signal is carried out. Such a subsampling method is disclosed by L. Chiariglione et al in IEEE Global Telecommunications Conference, CH1819.2 (1982), pages 810–814, under the title of "The Development of the European Videoteleconference Codec." According to Chiariglione et al, on-off control of the subsampling is carried out either at each scanning line or at a predetermined number of the lines. Inasmuch as the subsampling is carried out not only for a moving part of the picture but also for a still part of the picture, the picture is reproduced with a low quality for the still part.

SUMMARY OF THE INVENTION

It is therefore an object of this invention to provide a method of coding a digital video signal, whereby pictures can be reproduced with a high quality.

Other object of this invention will become clear as the description proceeds.

A method to which this invention is applicable is for coding a digital video signal representative of successive pictures, each divisible into a predetermined number of blocks of picture elements. According to this invention, the method comprises the steps of: detecting an original motion vector representative of a movement of each block between two of the pictures; predictively coding the digital video signal by using the original motion vector to produce a coded signal having a first part and a second part; processing the predetermined number of blocks into an on-off control signal; subsampling a part of the coded signal into a subsampled signal with reference to the on-off control signal and leaving a remaining part as it is as a non-subsampled signal; code-converting the subsampled and the non-subsampled video signals into a converted code signal; and code-converting the original motion vector and the on-off control signal into a converted motion vector and a converted control signal.

DESCRIPTION OF THE PREFERRED EMBODIMENT

Principles of the invention will be described at first.

Each picture has a moving part and a still part. The moving part substantially has a movement in the manner described hereinabove. The still part substantially has not the movement. When on-off control of subsampling is carried out either at each scanning line or at a predetermined number of the lines according to the Chiariglione et al article cited hereinbefore, the picture is reproduced with a low quality for the still part as described before. According to this invention, on-off control of subsampling is carried out at each block. It is therefore possible to carry out the subsampling only for the blocks included in the moving part. Inasmuch as the subsamping is not carried out for the blocks included in the still part, pictures can be reproduced with a high quality for the still part.

Figure 1:
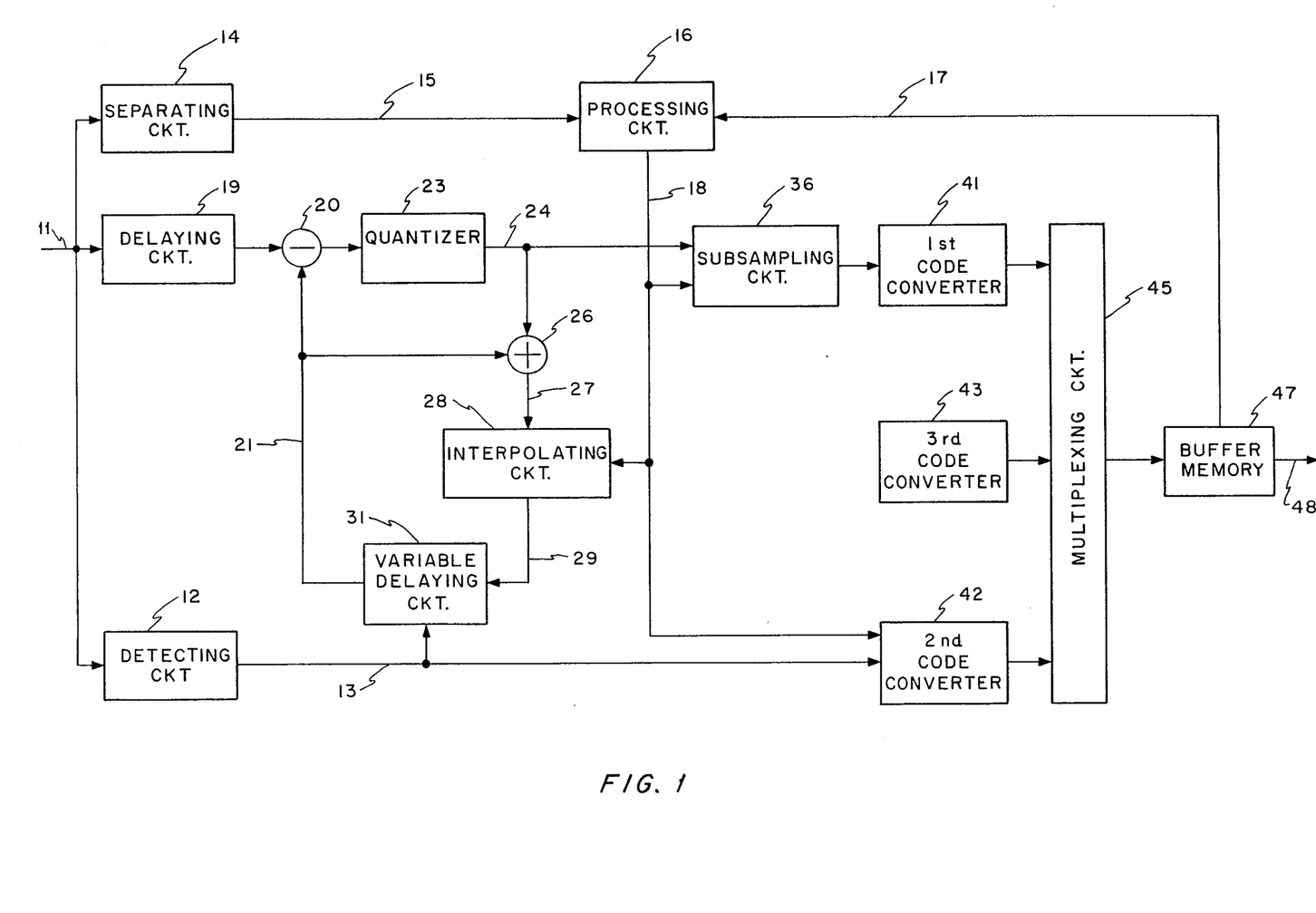
FIG. 1 is a block diagram of a coding device for use in carrying out a method according to an embodiment of this invention.

Referring to FIG. 1, description will now be made as regards a coding device for use in carrying out a method according to an embodiment of this invention.

The coding device is for coding a digital video signal 11 representative of successive pictures by using correlation between the successive pictures. Each of the successive pictures is divisible into a predetermined number of blocks of picture elements. Each block is decided, for example, by eight or sixteen picture elements for each scanning line and eight scanning lines and has 64 or 128 adjacent picture elements.

The coding device comprises a detecting circuit 12. The detecting circuit 12 detects movement of the blocks in the digital video signal 11 to produce an original motion vector 13 representative of the movement of each block between two of the pictures. The original motion vector 13 is substantially representative of a direction of the movement and a velocity of the movement. The detecting circuit 12 has a detection delay which is necessary to detect the original motion vector 13 for each block. The detecting circuit 12 is disclosed, for example, in U.S. Pat. No. 4,307,420 described hereinabove.

A separating circuit 14 responds to the digital video signal 11 and separates blocks into a moving part and a still part in each picture. In other words, the separating circuit 14 carries out judgement about whether each block belongs to the moving part or the still part. The separating circuit 14 thereby produces a judgement result or separating signal 15 representative of the moving and the still parts.

Description will be now made as regards the reason why the separating circuit 14 is necessary. When the original motion vector 13 has a magnitude of zero for a block, the block is highly possibly included in the still part. However, the block is not always included in the still part even if the magnitude is equal to zero. Thus, it is impossible to judge whether each block belongs to the moving part or the still part by using the original motion vector 13. This is the reason.

A method of the judgement is carried out by summing up absolute values of interframe differences for all picture elements included in each block to produce a sum of the absolute values at first. Thereafter, the sum is compared with a first threshold value. When the sum is greater than the first threshold value, the block is judged as the moving part. When the sum is not greater than the first threshold value, the block is judged as the still part. Another method of the judgement is carried out by comparing each of the absolute values with a second threshold value at first and then counting, for each block, the number of times at which each of the absolute values becomes greater than the second threshold value. The counted number is compared with a third threshold value for each block. When the counted number is greater than the third threshold value, the block is judged as the moving part. When the counted number is not greater than the third threshold value, the block is judged as the still part. The separating circuit 14 has a judgement delay which is necessary to carry out the judgement for each block. The judgement delay is equal to the detection delay. It is easy to make the judgement delay coincide with the detection delay.

As will later be described, a processing circuit 16 is responsive to the separating signal 15 and a state information signal 17 and is for processing the separating signal 15 and the state information signal 17 into an on-off control signal 18 indicative of on and off. A delaying circuit 19 delays the digital video signal 11 by a circuit delay equal to the judgement delay to produce a delayed video signal.

A subtracter 20 responds to the delayed video signal and a prediction signal 21 and carries out subtraction to produce a prediction error which is equal to a difference between the delayed video signal and the prediction signal 21. A quantizer 23 responds to the prediction error and quantizes the prediction error to produce a coded signal 24.

An adder 26 responds to the coded signal 24 and the prediction signal 21 and adds the prediction signal 21 to the coded signal 24 to locally decode the coded signal 24 into a first local decoded signal 27. Thus, the adder 26 is operable as a local decoding circuit which is responsive to the coded signal 24 and the prediction signal 21 and is for locally decoding the coded signal 24 into the first local decoded signal 27.

An interpolating circuit 28 is responsive to the on-off control signal 18. The interpolating circuit 28 interpolates the first local decoded signal 27 to produce an interpolated signal when the on-off control signal 18 indicates on. The interpolating circuit 28 produces the first local decoded signal 27 intact as an untouched signal as it stands when the on-off control signal 18 indicates off. The interpolating circuit 28 thereby produces the interpolated and the untouched signals collectively as a second local decoded signal 29. Operation of the interpolating circuit 28 will later be described in detail.

A variable delaying circuit 31 is responsive to the original motion vector 13 and is for delaying the second local decoded signal 29 by a variable delay which is equal to a period of each picture or frame when the movement represented by the original motion vector 13 is substantially equal to zero. The variable delay is varied in accordance with the movement represented by the original motion vector 13 when the movement represented by the original motion vector 13 is not substantially equal to zero. The variable delaying circuit 31 thereby produces a delayed signal as the prediction signal 21. Thus, a combination of the subtracter 20, the quantizer 23, the adder 26, the interpolating circuit 28, and the variable delaying circuit 31 is operable as a predictive coding circuit which is for predictively coding the digital video signal 11 by using the original motion vector 13 to produce the coded signal 24.

A subsampling circuit 36 responds to the on-off control signal 18. The subsampling circuit 36 subsamples a portion of the coded signal 24 into a subsampled signal when the on-off control signal 18 indicates on. The subsampling circuit 36 produces a remaining portion of the coded signal 24 as a non-subsampled signal by leaving the coded signal 24 untouched when the on-off control signal indicates off.

The subsampled signal will be described a little more in detail. The subsampling circuit 36 keeps a predetermined deleting pattern. Among a predetermined number of picture elements of the coded signal 24, the deleting pattern specifies at least one picture element which should be deleted. Each picture element so specified, is deleted in the subsampled signal and will be called a deleted element. When the on-off control signal 18 indicates on, the subsampling circuit 36 refers to the deleting pattern and leaves other picture elements as remaining picture elements in the subsampled signal.

Similarly, the interpolated signal of the second decoded signal 29 will be described. The interpolating circuit 28 keeps an interpolating pattern which is complementary to the predetermined deleting pattern. The interpolating pattern therefore specifies at least one time instant in the interpolated signal. At each of such time instants, a picture element should be interpolated in the interpolated signal as an interpolated element. When the on-off control signal 18 indicates on, the interpolating circuit 28 refers to the interpolating pattern and calculates the interpolated elements in accordance with a predetermined rule. If every other picture elements should be subsampled in the subsampled signal, the interpolating circuit 28 calculates as an interpolated element a mean value of two picture elements which appear in the coded signal 24 adjacent to each time instant specified by the interpolating pattern.

A first code converter 41 converts the subsampled and the non-subsampled signals into a converted code signal. The converted code signal is formed by codes, each of which is suitable to decrease a transmission rate of the coding device. The code is, for example, the Huffman code known in the art.

A second code converter 42 converts the original motion vector 13 and the on-off control signal 18 into a converted motion vector and a converted control signal. Operation of the second code converter 42 will later be described in detail.

The coding device receives not only the digital video signal 11 but also an original synchronization signal for use in synchronization of the digital video signal 11. A third code converter 43 converts the original synchronization signal into a converted synchronization signal in the manner known in the art.

A multiplexing circuit 45 multiplexes the converted code signal, the converted motion vector, the converted control signal, and the converted synchronization signal into a multiplexed signal. The multiplexed signal is sent through a buffer memory 47 to a transmission path at a constant transmission rate. Thus, the buffer memory serves to match an irregular production rate of the multiplexed signal with the constant transmission rate on the transmission path 48. The buffer memory 47 also supplies the processing circuit 16 with the state information signal 17. It is to be noted here that the buffer memory 47 has a certain memory capacity. The state information signal 17 is representative of, for example, a rate of information memorized in the buffer memory 47 to the memory capacity.

Description will now be made as regards operation of the processing circuit 16. The processing circuit 16 has a predetermined control rule for use in controlling production of a preliminary control signal indicative of on and off in accordance with the state information signal 17. The processing circuit 16 produces the preliminary control signal with reference to the state information signal 17 at first. Thereafter, the processing circuit 16 processes the preliminary control signal into the on-off control signal 18 with reference to the separating signal 15 which represents whether each block belongs to the moving part or the still part. The preliminary control signal is processed into the on-off control signal 18 so as to indicate off for blocks included in the still part even if the preliminary control signal indicates on. Thus, the processing circuit 16 processes the separating signal 15 and the state information signal 17 into the on-off control signal 18.

Description will now be made as regards a method according to an embodiment of this invention. The method is for coding the digital video signal 11 representative of successive pictures. Each picture is divisible into a predetermined number of blocks of picture elements as described before. According to the method, an original motion vector 13 is detected by the detecting circuit 12. The original motion vector 13 represents a movement of each block between two of pictures as described above. The digital video signal 11 is predictively coded with reference to the original motion vector 13 into a coded signal 24 in the manner described heretobefore. The predictive coding is carried out by a predictive coding circuit of the type described. The predetermined number of blocks are processed into an on-off control signal 18 by the processing circuit 16. A part of the coded signal 24 is subsampled into a subsampled signal with reference to the on-off control signal 18 and a remaining part is left as a non-subsampled signal as it is. The subsampling is carried out by the subsampling circuit 36. The subsampled and the non-subsampled signals are code-converted into a converted code signal by the first code converter 41. The original motion vector 13 and the on-off control signal 18 are code-converted into a converted motion vector and a converted control signal. According to the method, on-off control of subsampling is carried out for the blocks of each picture. Therefore, the subsampling can be carried out only for blocks included in the moving part. Inasmuch as the subsampling is not carried out for blocks included in the still part, pictures can be reproduced with a high quality for the still part.

Figure 2:
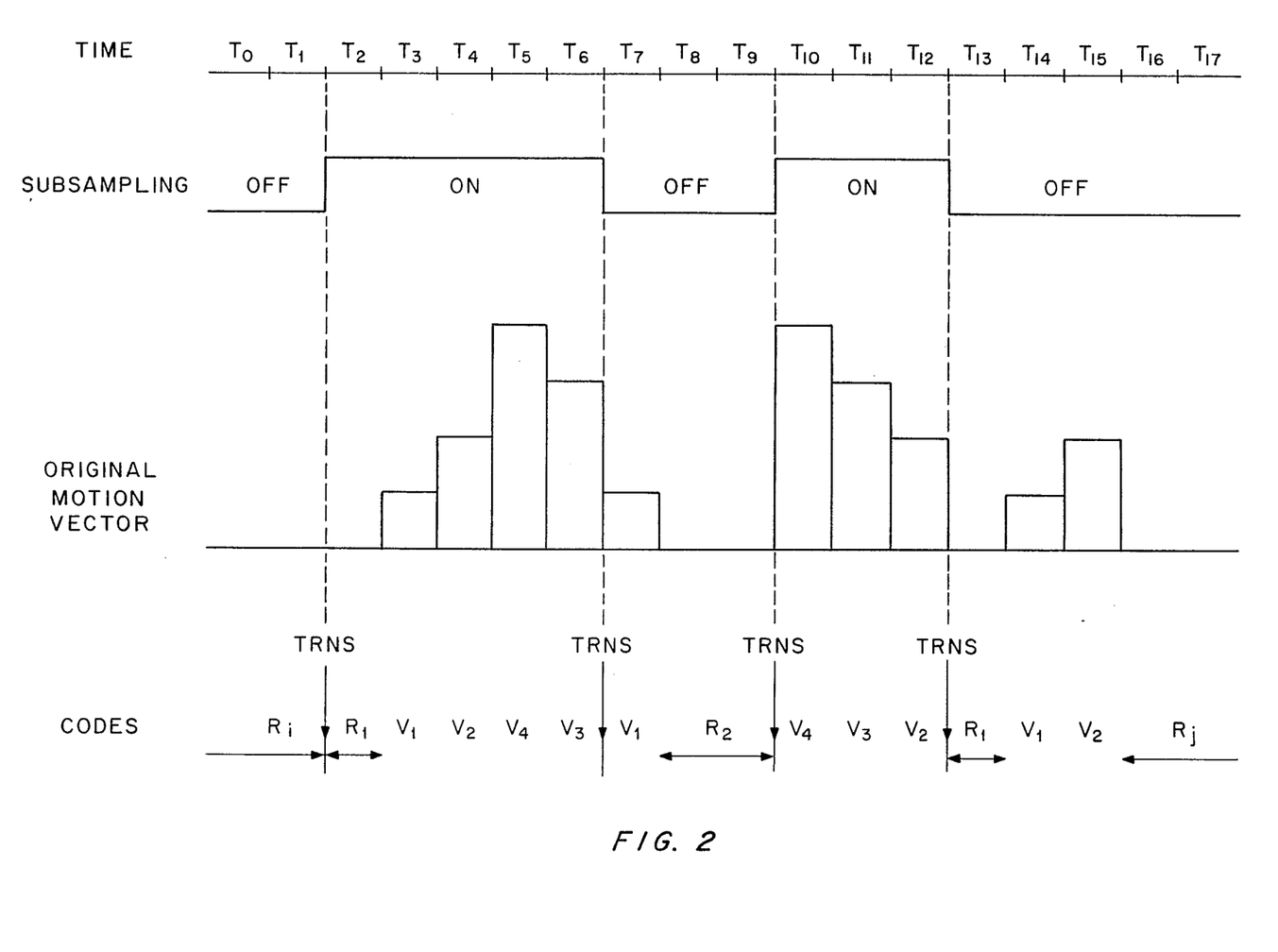
FIG. 2 is a time chart for use in describing operation of the coding device.

Referring to FIG. 2, description will now be made as regards operation of the second code converter 42 illustrated in FIG. 1. As depicted along the top line, a time axis is divisible into time intervals $T_0$ through $T_{17}$ in correspondence to the respective blocks of a part of a picture. It will be assumed that the subsampling is carried out between the time intervals $T_2$ and $T_6$ and between the time intervals $T_{10}$ and $T_{12}$ as depicted along a second line from the top. Between such time intervals, the on-off control signal 18 (FIG. 1) is indicative of on in the manner labelled ON. The subsampling is not carried out in the remaining time intervals. The on-off control signal 18 (FIG. 1) is indicative of off as indicated by labels OFF. In the manner depicted along a third line from the top, it will also be assumed that each of the original motion vectors has a magnitude which is not equal to zero between the time intervals $T_3$ and $T_7$, between the time intervals $T_{10}$ and $T_{12}$, and in the time intervals $T_{14}$ and $T_{15}$. Such original motion vectors will be called first partial original motion vectors. Each of the original motion vectors has a magnitude equal to zero in the remaining time intervals. The latter original motion vectors will be named second partial original motion vectors. By the second code converter 42 (FIG. 1), the first partial original motion vectors are code-converted into motion vector codes $V_1$, $V_2$, $V_3$, and $V_4$, respectively, as depicted along a bottom line. The motion vector code is, for example, the Huffman code. On the other hand, the second partial original motion vectors are converted to run length codes $R_i$ or $R_j$ where each of i and j represents a run length. For example, the second partial original motion vector or vectors are encoded into $R_1$, $R_2$, and $R_1$ for a time interval $T_2$, a continuation of time intervals $T_8$ and $T_9$, and another time interval $T_{13}$. The motion vector codes V (affix omitted) and the run length code R are used as the converted motion vector described before.

Although the second partial original motion vectors appear between the time intervals $T_0$ and $T_2$, the subsampling starts from the time interval $T_2$. The subsampling ends at an interface between the time intervals $T_6$ and $T_7$. When the subsampling starts or ends, the on-off control signal 18 is code-converted into a transition code TRNS by the second code converter 42 (FIG. 1) as depicted along the bottom line. Such transition codes TRNS are used as the converted control signal mentioned above and should be distinguishable from the motion vector and the run length codes. For this purpose, the transition codes TRNS should be a common code which will not statistically appear as the motion vector and the run length codes. It should be noted that two run length codes $R_i$ and $R_1$ are used instead of a single run length code $R_{(i+1)}$ for a duration which includes the time intervals $T_0$ to $T_2$. This is because a transition code TRNS is used at an interface between the time intervals $T_1$ and $T_2$. Incidentally, a picture usually begins at a block which belongs to a still part. The transition codes TRNS therefore indicates start and stop of the subsampling when placed in the multiplexed signal an odd and an even number of times.

Figure 3:
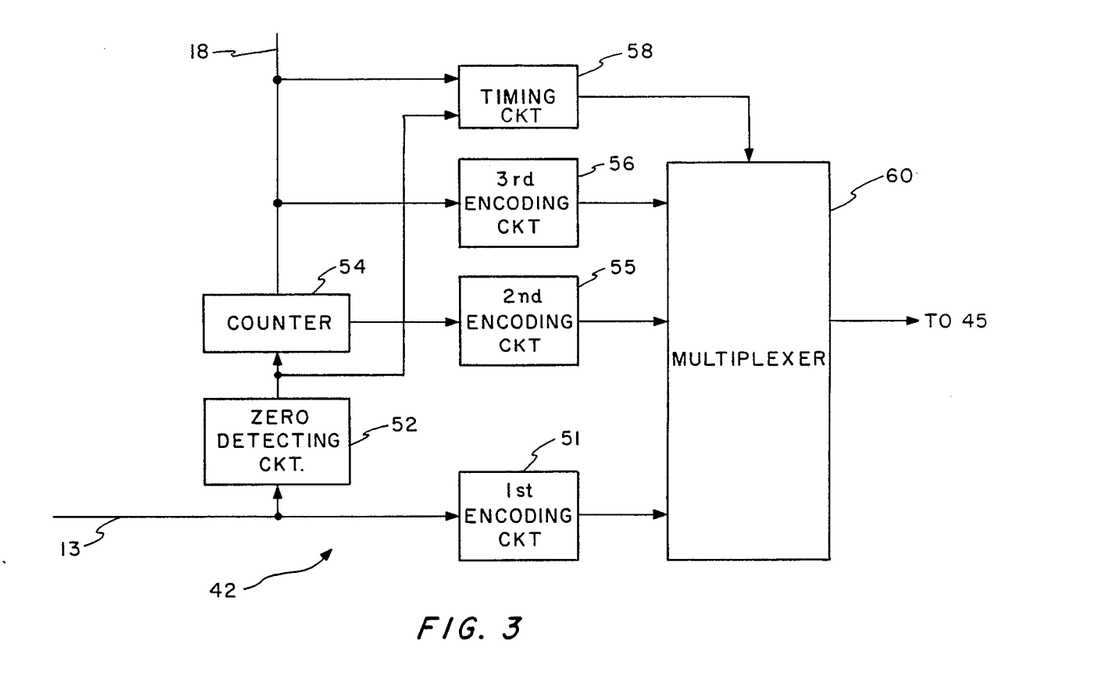
FIG. 3 is a block diagram of a code converter for use in the coding device.

Referring to FIG. 3, the second code converter 2 comprises a first encoding circuit 51. The first encoding circuit 51 responds to the original motion vector 13 and encodes the first partial original motion vectors into the motion vector codes. The first encoding circuit 51 may encode either the first partial original motion vector or a difference between the first partial original motion vector of a current block and an original motion vector which is representative of a block which next precedes the current block and may belong to whichever of the moving and the still parts. A zero detecting circuit 52 responds to the original motion vector 13 and detects the second partial original motion vector to produce a detection signal representative of detection of the second partial original motion vector. The zero detecting circuit 52 also produces a non-detection signal representative of non-detection of the second partial original motion vector and therefore the detection of the first partial original motion vector. As mentioned before, the second partial original motion vector has a magnitude which is equal to zero. A counter 54 is reset either by a trailing edge of the non-detection signal or by the on-off control signal 18 indicative of transition between on and off and counts the number of the detection signal as a counted value. Thus, the counter 54 counts the number of successive second partial original motion vectors. In other words, the counter 54 is operable as a run length detecting circuit for detecting the run length representative of the successive second partial original motion vectors. Responsive to the on-off control signal 18 indicative of transition between on and off, the counter 54 delivers the counted value to a second encoding circuit 55. The second encoding circuit 55 encodes the counted value into the run length code. A third encoding circuit 56 responds to the on-off control signal 18 to produce the transition codes TRNS whenever the on-off control signal is indicative of the transitions between on and off. A timing circuit 58 responds to the detection and the non-detection signals and the on-off control signal 18 and produces a multiplexer control signal. Controlled by the multiplexer control signal, a multiplexer 60 multiplexes the motion vector, the run length, and the transition codes into a partial multiplexed signal, such as a signal depicted along the bottom line in FIG. 2. The partial multiplexed signal is a combination of the converted motion vector and the converted control signal. The partial multiplexed signal is delivered to the multiplexing circuit 45 (FIG. 1).

Figure 4:
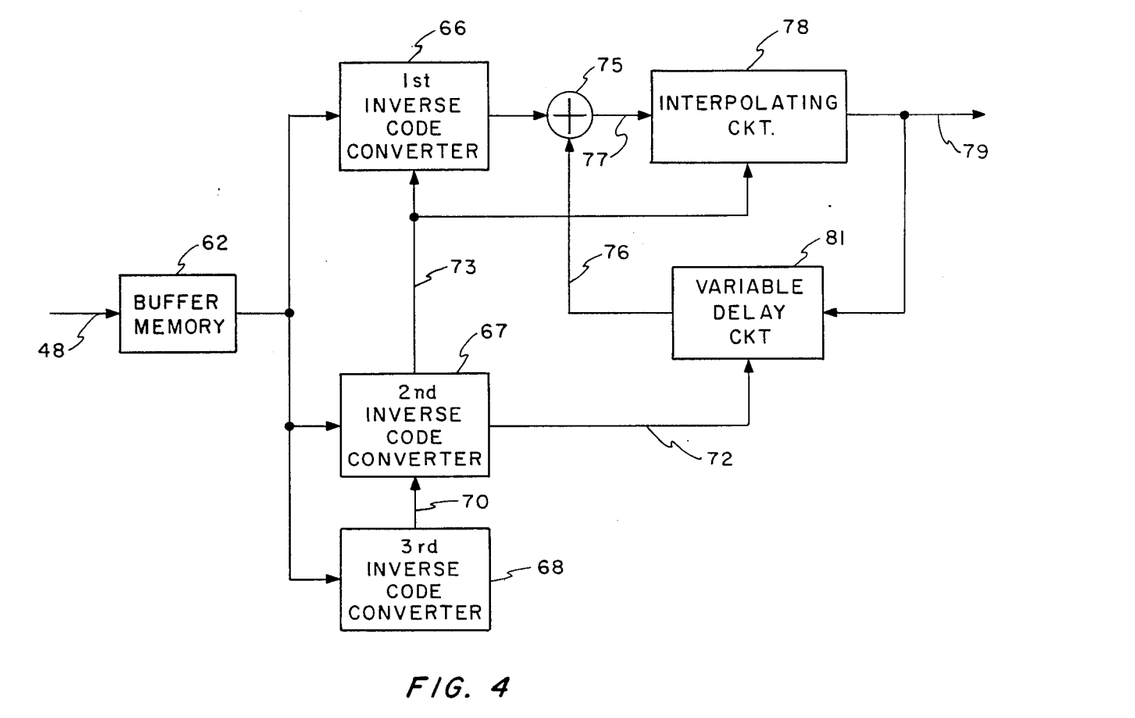
FIG. 4 is a block diagram of a decoding device for decoding an output signal of the coding device.

Referring to FIG. 4, a decoding device is for use in combination with the coding device illustrated with reference to FIG. 1 and comprises a buffer memory 62. The buffer memory 62 is supplied with the multiplexed signal through the transmission path 48 and serves to match the constant transmission rate on the transmission path 48 with a decoding rate which is necessary to decode the multiplexed signal. The buffer memory 62 delivers the multiplexed signal to first, second, and third inverse code converters 66, 67, and 68.

The multiplexed signal is given by a succession of the converted synchronization signal, a combination of the converted motion vector signal and the converted control signal, and the converted code signal. The third inverse code converter 68 converts the converted synchronization signal into a reproduction of the original synchronization signal and supplies the second inverse code converter 67 with a command signal 70 in order to inform appearance of the combination of the converted motion vector signal and the converted control signal in the multiplexed signal. In this manner, inverse code converters 66 to 68 produce reproductions of various signals used in the counterpart coding device, merely for brevity for description, such reproductions will be called by the names used hereinabove for the respective signals.

On reception of the command signal 70, the second inverse code converter 67 converts the converted motion vector signal and the converted control signal into the original motion vector 72 and the on-off control signal 73. Operation of the second inverse code converter 67 will later be described in detail.

The first inverse code converter 66 responds to the on-off control signal 73 and converts the converted code signal of the multiplexed signal into a prediction error. The prediction error corresponds to the coded signal described in FIG. 1. When the on-off control signal 73 is rendered on to indicate execution of subsampling operation, the converted code signal is subjected to inverse conversion to produce the prediction error for the remaining picture elements described in conjunction with FIG. 1. On the other hand, when the on-off control signal is rendered off to indicate interruption of the subsampling operation, inverse conversion is made to produce the prediction error for all picture elements of the block.

An adder 75 is for adding the prediction error and a prediction signal 76 and for producing a first local decoded signal 77 in the manner described hereinabove. Thus, the adder 75 is operable as a local decoding circuit which is responsive to the prediction error and the prediction signal 76 and is for locally decoding the prediction error into the first local decoded signal 77.

An interpolating circuit 78 is controlled by the on-off control signal 73. The interpolating circuit 78 interpolates the first local decoded signal 77 to produce an interpolated signal when the on-off control signal 73 indicates on. The interpolating circuit 78 produces the first local decoded signal 77 intact as an untouched signal as it stands when the on-off control signal 73 indicates off. The interpolating circuit 78 thereby produces the interpolated and the untouched signals collectively as a second local decoded signal 79. The second local decoded signal 79 provides the digital video signal 11 (FIG. 1) and is delivered to an external device (not shown). More detailed description is omitted as regards operation of the second interpolating circuit 78 because the operation is similar to that of the interpolating circuit 28 described in conjunction with FIG. 1.

A variable delaying circuit 81 is responsive to the original motion vector 72 and is for delaying the second local decoded signal 79 by a variable delay which is equal to a period of each picture or frame when the original motion vector 72 represents a movement which is substantially equal to zero. The variable delay is varied in accordance with the movement represented by the original motion vector 72 when the movement represented by the original motion vector 72 is not substantially equal to zero. The variable delaying circuit 81 thereby produces a delayed signal as the prediction signal 76. Thus, a combination of the adder 75, the interpolating circuit 78, and the variable delaying circuit 81 is operable as a predictive decoding circuit which is for predictively decoding the prediction error by using the original motion vector 73 to produce the digital video signal.

Figure 5:
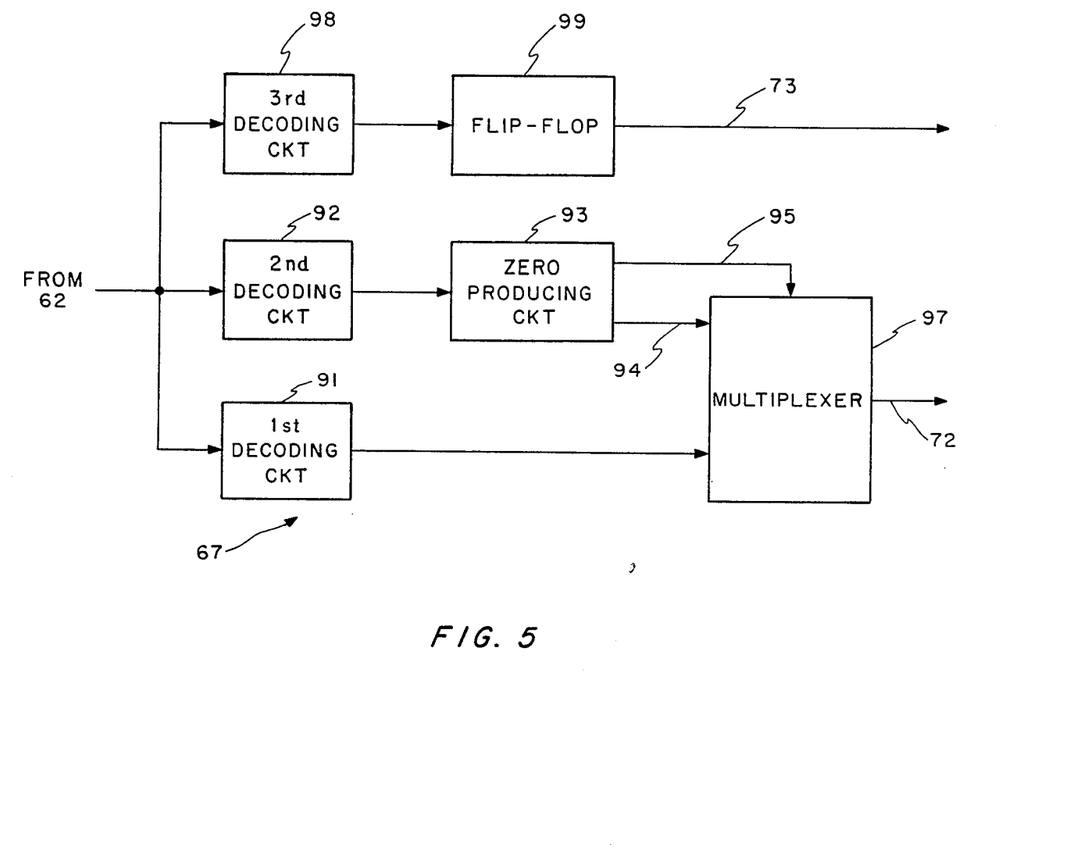
FIG. 5 is a block diagram of an inverse code converter for use in the decoding device.

Referring to FIG. 5, the second inverse code converter 67 comprises a first decoding circuit 91. The first decoding circuit 91 is supplied with the multiplexed signal from the second buffer memory 62. The first decoding circuit 91 decodes the motion vector codes $V_1$, $V_2$, $V_3$, and $V_4$ (FIG. 2) of the multiplexed signal into the first partial original motion vectors, respectively.

A second decoding circuit 92 decodes the multiplexed signal into a decoded run length code signal which corresponds to the run length codes $R_i$, $R_1$, $R_2$, and $R_j$ (FIG. 2) and which is delivered to a zero producing circuit 93. The decoded run length code signal is indicative of a run length. The zero producing circuit 93 produces second partial original motion vectors each of which has a magnitude of zero. The second partial original motion vectors are equal in number to the number of the blocks which is specified by the run length. Concurrently, the zero producing circuit 93 supplies a multiplexer 97 with a control signal for selecting the second partial original motion vectors as the original motion vectors 72. The control signal appears for a duration for which the second partial original motion vectors last. The duration is represented by a product of a single run length and a time interval for a single one of the blocks.

In the absence of the above-mentioned control signal, the multiplexer 97 selects as the original motion vectors 72 the first partial original motion vectors sent from the first decoding circuit 91.

A third decoding circuit 98 responds to the multiplexed signal and decodes the transition code TRNS (FIG. 2) of the multiplexed signal into a pulse signal which builds up when the third decoding circuit 98 receives each transition code. A flip-flop 99 responds to the pulse signal and converts the pulse signal into the on-off control signal 73.

While the present invention has thus far been described in conjunction with a preferred embodiment thereof, it will now readily possible for those skilled in the art to put this invention into practice in various other manners. For example, the subsampling circuit 36 may be included in the first code converter 41.

What is claimed is:

1. A method of coding a digital video signal which is representative of successive pictures, each picture being dividible into a predetermined number of blocks of picture elements, said method comprising the steps of:
   detecting an original motion vector representative of a movement of each block between two of said pictures;
   predictable coding said digital video signal by using said original motion vector to produce a coded signal;
   producing an on-off control signal representative of whether subsampling is turned on or off at each of said blocks;
   subsampling a part of said coded signal into a subsampled signal with reference to said on-off control signal and leaving as it is a remaining part as a non-subsampled signal;
   code-converting both said subsampled and said non-subsampled signals into a converted code signal; and
   code-converting said original motion vector and said on-off control signal into a converted motion vector and a converted control signal which is distinguishable from said converted motion vector.

2. A method as claimed in claim 1, wherein said converted control signal specifies transition points which appear in said on-off control signal when said on-off control signal is switched between off and on.

3. A coding device for coding a digital video signal which is representative of successive pictures by using a correlation between said successive pictures, each of said successive pictures being divisible into a predetermined number of blocks of picture elements, said coding device comprising:
   detecting means for detecting an original motion vector representative of movement of each block between two of said pictures:
   predictive coding means for predictably conding said digital video signal by using said original motion vector to produce a coded signal;
   separating means for separating said blocks into a moving part and a still part, said moving part having substantially all of said movement, said still part having substantially no movement, said separating means thereby producing a separating signal representative of said moving and said still parts;
   processing means responsive to said separating signal for processing said separating signal into an on-off control signal indicative of whether subsampling is turned on and off at each of said blocks;
   subsampling means responsive to said on-off control signal for subsampling said coded signal into a subsampled signal and into a non-subsampled signal when said on-off control signal indicates on and off, respectively, at each of said blocks;
   first code-converting means for converting said subsampled and said non-subsampled signals into a converted code signal;
   second code-converting means for converting said original motion vector and said on-off control signal into a converted motion vector signal and a converted control signal which is distinguishable from said converted code signal and said converted motion vector signal; and
   multiplexing means for multiplexing said converted code signal, said converted motion vector signal, and said converted control signal into a multiplexed signal.

4. A coding device as claimed in claim 3, wherein said converted control signal specifies transition points which appear in said on-off control signal when said on-off control signal is switched between off and on.

5. A coding device as claimed in claim 3, said predictive coding means including local decoding means responsive to said coded signal and a prediction signal for locally decoding said coded signal into a first local decoded signal, wherein said predictive coding means comprises:

interpolating means responsive to said on-off control signal for interpolating said first local decoded signal to produce an interpolated signal and for producing said first local decoded signal intact as an untouched signal when said on-off control signal indicates on and off, respectively, said interpolating means thereby producing said interpolated and said untouched signals collectively as a second local decoded signal; and variable delaying means responsive to said original motion vector for delaying said second local decoded signal to produce said prediction signal by providing a delay which is equal to a period of each picture when the movement represented by said original motion vector is substantially equal to zero, and, otherwise, by providing said delay varied in accordance with the movement represented by said original motion vector.

6. A decoding device for decoding a multiplexed signal which was produced by a coding device for coding a digital video signal representative of successive pictures by using a correlation between said successive pictures, each of said successive pictures being divisible into a predetermined number of blocks of picture elements, said coding device comprising:

detecting means for detecting an original motion vector representative of a movement of each block between two of said pictures;

predictive coding means for predictably coding said digital video signal by using said original motion vector to produce a coded signal;

separting means for separating said blocks into a moving part and a still part, said moving part having substantially all of said movement, said still part having substantially no movement, said separating means thereby producing a separating signal representative of said moving and said still parts;

processing means responsive to said separating signal for processing said separating signal into an on-off control signal indicative of whether subsampling is turned on and off at each of said blocks;

subsampling means reponsive to said on-off control signal for subsampling said coded signal into a subsampled signal and into a non-subsampled signal when said on-off control signal indicates on and off of said subsampling, respectively;

first code-converting means for converting both said subsampled and said non-subsampled signals into a converted code signal; and second code-converting means for converting both said original motion vector and said on-off control signal into a converted motion vector signal and a converted control signal which is distinguishable from said motion vector signal and said converted code signal; said multiplexed signal being produced by multiplexing said converted code signal, said converted motion vector signal, and said converted control signal;

said decoding device comprising:

first inverse code-converting means for converting said converted motion vector signal and said converted control signal which is distinguishable from said converted motion vector signal, into a reproduction of said original motion vector and said on-off control signal;

second inverse code-converting means responsive to said reproduction of the on-off control signal for converting said converted code signal into a reproduction of said coded signal with reference to said reproduction of the on-off control signal; and predictive decoding means for predictably decoding said reproduction of the coded signal by using said reproduction of the original motion vector to produce said digital video signal.

7. A decoding device as claimed in claim 6, said predictive decoding means including local decoding means responsive to said reproduction of the coded signal and a prediction signal for locally decoding said reproduction of the coded signal into a first local decoded signal, wherein said predictive decoding means comprises:

interpolating means responsive to said reproduction of the on-off control signal for interpolating said first local decoded signal to produce an interpolated signal and for producing said first local decoded signal intact as an untouched signal when said reproduction of the on-off control signal indicates on and off, respectively, said interpolating means thereby producing said interpolated and said untouched signals collectively as a second local decoded signal representative of said digital video signal; and variable delaying means responsive to said reproduction of the original motion vector for delaying said second local decoded signal to produce said prediction signal by providing a delay which is equal to a period of each picture when a movement represented by said reproduction of the original motion vector is substantially equal to zero, and, otherwise, by providing said delay varied in accordance with the movement represented by said reproduction of the original motion vector.

* * * * *